(12) United States Patent
Andersson et al.

(10) Patent No.: US 12,378,482 B2
(45) Date of Patent: *Aug. 5, 2025

(54) METHOD FOR PRODUCTION OF AVIATION FUEL

(71) Applicant: HALDOR TOPSØE A/S, Kgs. Lyngby (DK)

(72) Inventors: Asbjørn Sune Andersson, Bagsværd (DK); Ole Frej Alkilde, Valby (DK); Thi Hong Diep Duong, Skovlunde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/287,809

(22) PCT Filed: Oct. 23, 2019

(86) PCT No.: PCT/EP2019/078896
§ 371 (c)(1),
(2) Date: Apr. 22, 2021

(87) PCT Pub. No.: WO2020/083994
PCT Pub. Date: Apr. 30, 2020

(65) Prior Publication Data
US 2021/0395622 A1    Dec. 23, 2021

(30) Foreign Application Priority Data

Oct. 24, 2018 (DK) .......................... PA 2018 00767
Jul. 9, 2019 (DK) .......................... PA 2019 00851
Jul. 9, 2019 (DK) .......................... PA 2019 00852

(51) Int. Cl.
*C10G 65/12* (2006.01)
*C10G 3/00* (2006.01)
(Continued)

(52) U.S. Cl.
CPC ............... *C10G 65/12* (2013.01); *C10G 3/45* (2013.01); *C10G 3/46* (2013.01); *C10G 3/50* (2013.01);
(Continued)

(58) Field of Classification Search
CPC ........ C10G 65/12; C10G 45/62; C10G 47/18; C10G 47/20; C10G 2300/1011;
(Continued)

(56) References Cited

U.S. PATENT DOCUMENTS 7,846,323 B2    12/2010   Abhari et al.
8,193,399 B2     6/2012   Gosling
(Continued)

FOREIGN PATENT DOCUMENTS

CN    102124080 A    7/2011
CN    103328613 A    9/2013
(Continued)

OTHER PUBLICATIONS

International Search Report (PCT/ISA/210) and Written Opinion (PCT/ISA/237) mailed on Nov. 29, 2019, by the European Patent Office as the International Searching Authority for International Application No. PCT/EP2019/078887.
(Continued)

*Primary Examiner* — Michelle Stein
(74) *Attorney, Agent, or Firm* — Boone IP Law

(57) ABSTRACT

A process plant and a process for production of a hydrocarbon suitable for use as jet fuel from a feedstock being a renewable feedstock or an oxygenate feedstock, including combining the renewable feedstock with an amount of a hydrocracked intermediate product, directing it to contact a material catalytically active in hydrodeoxygenation under hydrodeoxygenation conditions to provide a hydrodeoxygenated intermediate product, fractionating the hydrodeoxy-
(Continued)

genated intermediate product in at least two fractions including a first fraction of which at least 90% boils below a defined boiling point and a second fraction of which at least 90% boils above the defined boiling point, directing at least an amount of the second fraction to contact a material catalytically active in hydrocracking under hydrocracking conditions to provide the hydrocracked intermediate product, the process being suited for efficiently converting the upper-boiling point of an oxygenate feedstock such as a renewable feedstocks to a lower boiling product.

15 Claims, 3 Drawing Sheets

(51) Int. Cl.
    C10G 45/48    (2006.01)
    C10G 45/52    (2006.01)
    C10G 45/62    (2006.01)
    C10G 47/14    (2006.01)
    C10G 47/18    (2006.01)
    C10G 47/20    (2006.01)
    C10G 67/02    (2006.01)
    C10G 69/04    (2006.01)
    C10L 1/08    (2006.01)

(52) U.S. Cl.
CPC ............. *C10G 45/48* (2013.01); *C10G 45/52* (2013.01); *C10G 45/62* (2013.01); *C10G 47/14* (2013.01); *C10G 47/18* (2013.01); *C10G 47/20* (2013.01); *C10G 67/02* (2013.01); *C10G 69/04* (2013.01); *C10L 1/08* (2013.01); *C10G 2300/1011* (2013.01); *C10G 2300/1014* (2013.01); *C10G 2300/1018* (2013.01); *C10G 2300/301* (2013.01); *C10G 2300/304* (2013.01); *C10G 2300/4006* (2013.01); *C10G 2300/4012* (2013.01); *C10G 2300/4018* (2013.01); *C10G 2300/4081* (2013.01); *C10G 2300/802* (2013.01); *C10G 2400/04* (2013.01); *C10G 2400/08* (2013.01); *C10L 2200/043* (2013.01); *C10L 2200/0484* (2013.01); *C10L 2270/04* (2013.01)

(58) Field of Classification Search
CPC .... C10G 2300/1014; C10G 2300/1018; C10G 2300/301; C10G 2300/4006; C10G 2300/4012; C10G 4300/4018; C10G 2400/08

See application file for complete search history.

(56) References Cited

U.S. PATENT DOCUMENTS

| | | | |
|---|---|---|---|
| 9,039,790 B2 | 5/2015 | Kalnes | |
| 2009/0158637 A1* | 6/2009 | McCall | C10G 45/02 44/308 |
| 2009/0229173 A1* | 9/2009 | Gosling | C10G 3/42 208/57 |
| 2009/0250376 A1 | 10/2009 | Brandvold et al. | |
| 2009/0283442 A1* | 11/2009 | McCall | C10G 3/46 208/15 |
| 2009/0287029 A1* | 11/2009 | Anumakonda | C10G 45/64 585/16 |
| 2010/0000908 A1 | 1/2010 | Markkanen et al. | |
| 2010/0133144 A1* | 6/2010 | Kokayeff | C10G 65/043 208/57 |
| 2010/0242349 A1 | 9/2010 | Abe et al. | |
| 2011/0166396 A1* | 7/2011 | Egeberg | C10G 3/50 585/240 |
| 2011/0219677 A1 | 9/2011 | Koyama et al. | |
| 2011/0239532 A1* | 10/2011 | Baldiraghi | C10G 3/50 44/388 |
| 2011/0319683 A1* | 12/2011 | Abhari | C10G 3/50 585/16 |
| 2012/0216449 A1 | 8/2012 | Hayasaka et al. | |
| 2014/0148626 A1* | 5/2014 | Parimi | C10G 3/45 585/253 |
| 2014/0187827 A1 | 7/2014 | Abdallah et al. | |
| 2015/0057474 A1* | 2/2015 | Nousiainen | C10L 1/08 585/16 |
| 2016/0130509 A1* | 5/2016 | Nousiainen | C10G 65/08 585/324 |
| 2016/0177188 A1* | 6/2016 | Vilonen | C10G 3/50 585/16 |
| 2016/0243537 A1* | 8/2016 | Robinson | B01J 37/20 |
| 2016/0289135 A1* | 10/2016 | Fichtl | C10G 3/50 |
| 2016/0289576 A1* | 10/2016 | Eilos | C10G 3/50 |
| 2017/0218288 A1 | 8/2017 | Vauhkonen et al. | |
| 2017/0327757 A1* | 11/2017 | Abhari | C10L 5/361 |
| 2018/0163144 A1 | 6/2018 | Weiss et al. | |
| 2019/0185758 A1* | 6/2019 | Tsuto | B01J 35/0013 |
| 2020/0017775 A1* | 1/2020 | Lindberg | C10G 47/00 |
| 2021/0371761 A1 | 12/2021 | Andersson et al. | |
| 2022/0127537 A1 | 4/2022 | Bozzano et al. | |

FOREIGN PATENT DOCUMENTS

| | | | | |
|---|---|---|---|---|
| CN | 105378034 A | 3/2016 | | |
| CN | 107912046 A | 4/2018 | | |
| JP | 2011515539 A | 5/2011 | | |
| JP | 2015007238 A | 1/2015 | | |
| KR | 1020120103499 A | 3/2012 | | |
| WO | 2008124607 A1 | 10/2008 | | |
| WO | 2009120242 A1 | 10/2009 | | |
| WO | 2010/000934 A1 | 1/2010 | | |
| WO | WO-2010143980 A1 * | 12/2010 | ............... | C01B 3/38 |
| WO | 2011148046 A1 | 12/2011 | | |
| WO | 2015002936 A1 | 1/2015 | | |
| WO | 2015004329 A1 | 1/2015 | | |
| WO | 2017197017 A1 | 11/2017 | | |
| WO | 2018058172 A1 | 4/2018 | | |

OTHER PUBLICATIONS

International Search Report (PCT/ISA/210) and Written Opinion (PCT/ISA/237) mailed on Nov. 29, 2019, by the European Patent Office as the International Searching Authority for International Application No. PCT/EP2019/078896.
International Search Report (PCT/ISA/210) and Written Opinion (PCT/ISA/237) mailed on Nov. 29, 2019, by the European Patent Office as the International Searching Authority for International Application No. PCT/EP2019/078901.
International Search Report (PCT/ISA/210) and Written Opinion (PCT/ISA/237) mailed on Nov. 29, 2019, by the European Patent Office as the International Searching Authority for International Application No. PCT/EP2019/078904.
International Search Report (PCT/ISA/210) and Written Opinion (PCT/ISA/237) mailed on Nov. 29, 2019, by the European Patent Office as the International Searching Authority for International Application No. PCT/EP2019/078909.
Search Report mailed on Jan. 9, 2020 by the Danish Patent Office for Application No. PA 2019 00851.
Search Report mailed on Jan. 9, 2020 by the Danish Patent Office for Application No. PA 2019 00852.
Search Report mailed on May 22, 2019 by the Danish Patent Office for Application No. PA 2018 00767.
Office Action received for Chinese Patent Application No. 201980067845.3, mailed on Apr. 8, 2022, 18 pages (10 pages of English Translation and 8 pages of Original Document).
Office Action issued on Oct. 20, 2022, by the Intellectual Property India, Government of India in corresponding Indian Patent Application No. 202117018086, and an English Translation of the Office Action. (6 pages).

(56) References Cited

OTHER PUBLICATIONS

Office Action (Second Office Action) issued on Oct. 25, 2022 by the China National Intellectual Property Administration in corresponding Chinese Patent Application No. 201980070183.5, and an English Translation of the Office Action. (15 pages).
Zhu, Y. "Process of Petroleum Refining" (vol. II), China Petrochemical Press, pp. 152-154, May 1992 (with Concise Explanation of Relevance) (7 pages).
Office Action (Second Office Action) issued on Jul. 7, 2022 by the China National Intellectual Property Administration in corresponding Chinese Patent Application No. 201980067845.3, and an English Translation of the Office Action. (19 bages).
Office Action (Second Office Action) issued on Dec. 27, 2022 by the National Intellectual Property Office in corresponding Chinese Patent Application No. 201980069365.0, and an English Translation of the Office Action. (17 pages).
International Preliminary Report on Patentability received for PCT Patent Application No. PCT/EP2019/078887, mailed on May 6, 2021, 10 pages.
International Preliminary Report on Patentability received for PCT Patent Application No. PCT/EP2019/078896, mailed on May 6, 2021, 9 pages.
International Preliminary Report on Patentability received for PCT Patent Application No. PCT/EP2019/078901, mailed on May 6, 2021, 8 pages.
International Preliminary Report on Patentability received for PCT Patent Application No. PCT/EP2019/078904, mailed on May 6, 2021, 8 pages.
International Preliminary Report on Patentability received for PCT Patent Application No. PCT/EP2019/078909, mailed on May 6, 2021, 9 pages.
Notice of Allowance received for Chinese Patent Application No. 201980069365.0, mailed on Jun. 5, 2023, 3 pages (2 pages of English Translation and 1 page of Original Document).
Notice of Allowance received for Chinese Patent Application No. 201980069855, mailed on Aug. 17, 2023, 3 pages (2 pages of English Translation and 1 page of Original Document).
Office Action received for Chinese Patent Application No. 201980069365.0, mailed on May 18, 2022, 11 pages (6 pages of English Translation and 5 pages of Original Document).
Office Action received for Chinese Patent Application No. 201980069369, mailed on Apr. 13, 2022, 20 pages (11 pages of English Translation and 9 pages of Original Document).
Office Action received for Chinese Patent Application No. 201980069369.9, mailed on Mar. 4, 2023, 9 pages of original document only.
Office Action received for Chinese Patent Application No. 201980069855, mailed on Apr. 2, 2022, 11 pages (6 pages of English Translation and 5 pages of Original Document).
Office Action received for Chinese Patent Application No. 201980069855, mailed on Feb. 28, 2023, 7 pages (4 pages of English Translation and 3 pages of Original Document).
Office Action received for Chinese Patent Application No. 201980070183, mailed on Apr. 8, 2022, 16 pages (9 pages of English Translation and 7 pages of Original Document).
Office Action received for European U.S. Appl. No. 19/794,502, mailed on Mar. 13, 2023, 8 pages.
Search Report received for Chinese Patent Application No. 201980069365, mailed on May 11, 2022, 1 page of Original Document Only.
Second Office Action received for Chinese Patent Application No. 201980069369, mailed on Oct. 27, 2022, 22 pages (13 pages of English Translation and 9 pages of Original Document).
Second Office Action received for Chinese Patent Application No. 201980069855, mailed on Aug. 22, 2022, 7 pages (4 pages of English Translation and 3 pages of Original Document).
Request for the Submission of an Opinion issued by the Korean Office Action for Application No. 10-2021-7013157 dated Apr. 30, 2021 (22 pages).

* cited by examiner

METHOD FOR PRODUCTION OF AVIATION FUEL

BACKGROUND

Conversion of renewables in hydroprocessing has so far been focused on making diesel, since the paraffins corresponding to the typical fatty acids of biological materials such as vegetable oils and animal fats (C14, C16 and C18) typical boil from 250° C. to 320° C., corresponding well with typical diesel products boiling from 150° C. to 380° C. Jet fuel products require a boiling range of 120° C. to 300° C. or 310° C., which means that the heavy part of a paraffins from renewable feedstocks needs to be converted into lighter materials to produce only jet fuel. A further challenge in the production of jet fuel from renewables is the discovery of a surprisingly high production of aromatics, during hydrotreatment of renewable feedstocks. The present disclosure relates to a process having a high yield of renewable jet fuel meeting typical product requirements by converting the heavy material to lighter material and by limiting the amount of aromatics in the product.

It is known to produce jet fuel from renewable feedstocks by co-producing some jet fuel in a unit designed for making diesel. However, there is an interest in making a full conversion from renewable feedstocks boiling mainly in the diesel range to jet fuel products, which requires significant conversion.

The standard controlling the quality of jet fuel originating from hydroprocessed oxygenates such as esters and fatty acids is ASTM D7566, A2.1, which inter alia specifies the boiling point curve and composition. Most of these properties can be easily met by hydrotreating and fractionation. However, special care need to be taken to meet the freezing point (FP) requirement of max −40° C. and the total aromatics content of max 0.5 wt %. In addition, the standard requires an amount of low boiling product by requiring $T_{10}$, i.e. the temperatures at which 10% has been distilled according to ASTM D86, to be below 205° C. The final boiling point (FBP) is specified as 300° C., according to ASTM D86, which means that all material distilling above 300° C. according to ASTM D86 needs to be converted into lighter components to fall into the jet fuel range.

SUMMARY

Now according to the present disclosure it is proposed to carry out jet fuel production in a reverse stage two-stage configuration, where the feed is hydrodeoxygenated and optionally isomerized in the first stage, and after removal of sour gases the product is fractionated and a kerosene fraction is hydro-dearomatized and optionally isomerized in a second stage. The heavy fraction is directed to the pre-stage for conversion over a hydrocracking catalyst. By this process, the yield loss is reduced, as only the stream heavier than kerosene contacts the hydrocracking catalyst. Isomerization to improve the freezing point of the kerosene fraction can be done in first stage, second stage or both stages.

In the following the term stage shall be used for a section of the process, in which no separation is performed.

In the following the abbreviation $ppm_{molar}$ shall be used to signify atomic parts per million.

In the following the abbreviation $ppm_v$ shall be used to signify volumetric parts per million, e.g. molar gas concentration.

In the following the abbreviation % wt shall be used to signify weight percentage.

In the following the abbreviation vol/vol % shall be used to signify volume percentage for a gas.

In the following the term renewable feedstock or hydrocarbon shall be used to indicate a feedstock or hydrocarbon originating from biological sources or waste recycle. Recycled waste of fossil origin such as plastic shall also be construed as renewable.

In the following the term hydrodeoxygenation shall be used to signify removal of oxygen from oxygenates by formation of water in the presence of hydrogen, as well as removal of oxygen from oxygenates by formation of carbon oxides in the presence of hydrogen.

In the following, the term topology of a molecular sieve is used in the sense described in the "Atlas of Zeolite Framework Types," Sixth Revised Edition, Elsevier, 2007, and three letter framework type codes are used in accordance herewith.

A broad aspect of the present disclosure relates to a process for production of a hydrocarbon e.g. suitable for use as jet fuel, from a feedstock being oxygenate feedstock, comprising the steps of combining the feedstock with an amount of a hydrocracked intermediate product, directing it to contact a material catalytically active in hydrodeoxygenation under hydrodeoxygenation conditions to provide a hydrodeoxygenated intermediate product, fractionating said hydrodeoxygenated intermediate product in at least two fractions including a first fraction of which at least 90% boils below a defined boiling point and a second fraction of which at least 90% boils above said defined boiling point, directing at least an amount of said second fraction to contact a material catalytically active in hydrocracking under hydrocracking conditions to provide the hydrocracked intermediate product, with the associated benefit of such a process being well suited for efficiently converting the upper-boiling point of an oxygenate feedstock such as a renewable feedstocks to a lower boiling product, such as nonfossil kerosene.

In a further embodiment step b comprises separating the hydrocracked intermediate product (22, 212) according to boiling point, to provide a hydrocracked intermediate jet product (80, 224) having T10 above 205° C. and final boiling point below 310° C. according to ASTM D86, with the associated benefit of the product of such a process fulfilling boiling point specifications of the renewable jet fuel specification ASTM D7566.

In a further embodiment the total volume of hydrogen sulfide relative to the volume of molecular hydrogen in the gas phase of the total stream directed to contact the material catalytically active in hydrodeoxygenation is at least 50 $ppm_v$, 100 $ppm_v$ or 200 $ppm_v$, possibly originating from an added stream comprising one or more sulfur compounds, such as dimethyl disulfide or fossil fuels, with the associated benefit of ensuring stable operation of a material catalytically active in hydrodeoxygenation comprising a sulfided base metal, if the feedstock comprises an insufficient amount of sulfur.

In a further embodiment said renewable feedstock comprises at least 50% wt triglycerides or fatty acids, with the associated benefit of such a feedstock being highly suited for providing a jet fuel with excellent properties.

In a further embodiment hydrodeoxygenation conditions involve a temperature in the interval 250-400° C., a pressure in the interval 30-150 Bar, and a liquid hourly space velocity (LHSV) in the interval 0.1-2 and wherein the material catalytically active in hydrodeoxygenation comprises molybdenum or possibly tungsten, optionally in combination with nickel and/or cobalt, supported on a carrier comprising one or more refractory oxides, such as alumina, silica or titania, with the associated benefit of such process conditions being well suited for cost effective removal of heteroatoms, especially oxygen from a renewable feedstock.

In a further embodiment hydrocracking conditions involve a temperature in the interval 250-400° C., a pressure in the interval 30-150 Bar, and a liquid hourly space velocity (LHSV) in the interval 0.5-4, optionally together with intermediate cooling by quenching with cold hydrogen, feed or product and wherein the material catalytically active in hydrocracking comprises (a) one or more active metals taken from the group platinum, palladium, nickel, cobalt, tungsten and molybdenum, (b) an acidic support taken from the group of a molecular sieve showing high cracking activity, and having a topology such as MFI, BEA and FAU and amorphous acidic oxides such as silica-alumina and (c) a refractory support such as alumina, silica or titania, or combinations thereof, with the associated benefit of such process conditions being highly suited for adjusting the boiling point of a product to match the kerosene boiling point range.

In a further embodiment the process conditions are selected such that the conversion, defined as the difference in the amount of material boiling above 310° C. in said hydrocracked intermediate product and the amount of material boiling above 310° C. in said second fraction, relative to the amount of material boiling above 310° C. in said second fraction, is above 20%, 50% or 80%, with the associated benefit of providing a process with full or substantially full overall conversion, while avoiding excessive conditions and excessive yield loss.

In a further embodiment at least an amount of said first fraction is directed to contact a material catalytically active in hydrodearomatization under hydrodearomatization conditions to provide a hydrodearomatized product comprising less than 1 wt/wt %, 0.5 wt/wt % or 0.1 wt/wt %, calculated by total mass of the aromatic molecules relative to all hydrocarbons in the stream, with the associated benefit of the product of such a process fulfilling jet fuel specification ASTM D7566.

In a further embodiment hydrodearomatization conditions involve a temperature in the interval 200-350° C., a pressure in the interval 20-100 Bar, and a liquid hourly space velocity (LHSV) in the interval 0.5-8 and wherein said material catalytically active in hydrodearomatization comprises an active metal taken from the group comprising platinum, palladium, nickel, cobalt, tungsten and molybdenum, preferably one or more elemental noble metals such as platinum or palladium and a refractory support, preferably amorphous silica-alumina, alumina, silica or titania, or combinations thereof, with the associated benefit of such process conditions being suitable for hydrogenation of aromates. Said material catalytically active in hydrodearomatization under hydrodearomatization conditions may be a material catalytically active in hydrocracking or material catalytically active isomerization operating at moderate temperatures favoring hydrodearomatization. Hydrodearomatization conditions preferably involve at least 50% or 80% conversion of aromatics.

In a further embodiment a hydrogen rich stream comprising at least 90 vol/vol % hydrogen is directed to contact the material catalytically active in hydrodearomatization, with the associated benefit of directing high purity hydrogen required by the overall process to the hydrodearomatization step contributing to shifting the equilibrium away from aromatics.

In a further embodiment at least an amount of said first fraction or said hydrodearomatized product is directed to contact a material catalytically active in isomerization under isomerization conditions, with the associated benefit of such a process providing a product complying with the requirements to cold flow properties for jet fuels.

In a further embodiment isomerization conditions involves a temperature in the interval 250-350° C., a pressure in the interval 30-150 Bar, and a liquid hourly space velocity (LHSV) in the interval 0.5-8 and wherein the material catalytically active in isomerization comprises an active metal taken from the group comprising platinum, palladium, nickel, cobalt, tungsten and molybdenum, preferably one or more elemental noble metals such as platinum or palladium, an acidic support preferably a molecular sieve, more preferably having a topology taken from the group comprising MOR, FER, MRE, MWW, AEL, TON and MTT and an amorphous refractory support comprising one or more oxides taken from the group comprising alumina, silica and titania, with the associated benefit of such conditions and materials being a cost effective and selective process for adjusting the cold flow properties of product.

In a further embodiment the treated product is directed to a gas/liquid separator to provide a second stage gaseous fraction and a treated intermediate jet product which is directed to a further means of separation, to provide said hydrocarbon fraction suitable for use as a jet fuel and a treated product off gas, with the associated benefit of such a stabilization step providing a jet fuel product in compliance with flash point requirement of jet fuel.

A further aspect of the present disclosure relates to a process plant for production of a hydrocarbon fraction from an oxygenate feedstock, said process plant comprising a hydrodeoxygenation section, a hydrocracking section and a fractionation section, said process plant being configured for directing the feedstock and an amount of a hydrocracked intermediate product to the hydrodeoxygenation section to provide a hydrodeoxygenated intermediate product, separating the hydrodeoxygenated intermediate product in said fractionation section to provide at least two fractions, including a low boiling product fraction and a high boiling product fraction, directing at least an amount of the high boiling product fraction to the hydrocracking section to provide a hydrocracked intermediate product, directing at least an amount of said hydrocracked intermediate product as said further feedstock, with the associated benefit of such a process plant being suited for carrying out the disclosed process for cost effective and selective production of jet fuel in compliance with specification ASTM D7566, A2.1.

The processes described in the present disclosure receives a renewable feedstock and/or an oxygenate feedstock which comprises one or more oxygenates taken from the group consisting of triglycerides, fatty acids, resin acids, ketones, aldehydes, alcohols, phenols and aromatic carboxylic acids where said oxygenates originate from one or more of a biological source, a gasification process, a pyrolysis process, Fischer-Tropsch synthesis, methanol based synthesis or a further synthesis process, especially obtained from a raw material of renewable origin, such as originating from plants, algae, animals, fish, vegetable oil refining, domestic waste, used cooking oil, plastic waste, rubber waste or industrial organic waste like tall oil or black liquor. Some of these feedstocks may contain aromatics; especially products derived by pyrolysis or other processes from e.g. lignin and wood or waste products from e.g. frying oil. Depending on source, the oxygenate feedstock may comprise from 1 wt/wt % to 40 wt/wt %. Biological sources will typically comprise around 10 wt/wt %, and derivation products from 1 wt/wt % to 20 wt/wt % or even 40 wt/wt %.

For the conversion of renewable feedstocks and/or oxygenate feedstocks into hydrocarbon transportation fuels, the feedstocks are together with hydrogen directed to contact a material catalytically active in hydrotreatment, especially hydrodeoxygenation. Especially at elevated temperatures the catalytic hydrodeoxygenation process may have side reactions forming a heavy product e.g. from olefinic molecules in the feedstock. To moderate the release of heat, a liquid hydrocarbon may be added, e.g. a liquid recycle stream or an external diluent feed. If the process is designed for co-processing of fossil feedstock and renewable feedstock, it is convenient to use the fossil feedstock as diluent, since less heat is released during processing of fossil feedstock, as fewer heteroatoms are released and less olefins are saturated. In addition to moderating the temperature, the recycle or diluent also has the effect of reducing the potential of olefinic material to polymerize, which will form an undesired heavy fraction in the product. The resulting product stream will be a hydrodeoxygenated intermediate product stream comprising hydrocarbons, typically n-paraffins, and sour gases such as $CO$, $CO_2$, $H_2O$, $H_2S$, $NH_3$ as well as light hydrocarbons, especially C3 and methane. Especially at elevated temperatures the catalytic hydrodeoxygenation process may result in side reactions forming aromatics. If the feedstocks comprises nitrogen, ammonia may be formed, which can have an effect of deactivating the catalytically active material, thus requiring such elevated temperatures, with consequential formation of aromatics, in amounts above the limit of ASTM D7566 defining jet fuel specification.

The material catalytically active in hydrodeoxygenation typically comprises an active metal (one or more sulfided base metals such as nickel, cobalt, tungsten or molybdenum, but possibly also elemental noble metals such as platinum and/or palladium) and a refractory support (such as alumina, silica or titania or combinations thereof).

Hydrodeoxygenation involves directing the feedstock to contact a catalytically active material typically comprising one or more sulfided base metals such as nickel, cobalt, tungsten or molybdenum, but possibly also elemental noble metals such as platinum and/or palladium, supported on a carrier comprising one or more refractory oxides, typically alumina, but possibly silica or titania. The support is typically amorphous. The catalytically active material may comprise further components, such as boron or phosphorous. The conditions are typically a temperature in the interval 250-400° C., a pressure in the interval 30-150 Bar, and a liquid hourly space velocity (LHSV) in the interval 0.1-2. Hydrodeoxygenation is typically exothermal, and with the presence of a high amount of oxygen, the process may involve intermediate cooling e.g. by quenching with cold hydrogen, feed or product. The feedstock may preferably contain an amount of sulfur to ensure sulfidation of the metals, in order to maintain their activity. If the gas phase comprises less than 10, 50 or 100 $ppm_v$ sulfur, a sulfide donor, such as dimethyldisulfide (DMDS) may be added to the feed.

The hydrodeoxygenated intermediate product will mainly be of same structure as the carbon skeleton of the feedstock oxygenates, or if the feedstock comprises triglycerides, n-paraffins, but possibly of a shorter length than the fatty acids. Typically, the hydrodeoxygenated intermediate product will be dominated by linear alkanes having boiling point range (250° C. to 320° C.) and a freezing point (0° C. to 30° C.) unsuited for use as jet fuel. Some heavy components and aromatics may also be formed in the hydrodeoxygenation step if the unsaturated fatty acids polymerizes and form aromatic structures even for an oxygenate feedstock comprising less than 1% aromatics.

For the hydrodeoxygenated intermediate product to be used as a fuel in practice, the freezing point must be adjusted. The freezing point is adjusted by isomerization of n-paraffins to i-paraffins, by directing the hydrodeoxygenated intermediate product to contact a material catalytically active in isomerization The material catalytically active in isomerization typically comprises an active metal (either elemental noble metals such as platinum and/or palladium or sulfided base metals such as nickel, cobalt, tungsten and/or molybdenum), an acidic support (typically a molecular sieve showing high shape selectivity, and having a topology such as MOR, FER, MRE, MWW, AEL, TON and MU) and a typically amorphous refractory support (such as alumina, silica or titania, or combinations thereof). The catalytically active material may comprise further components, such as boron or phosphorous. Preferred isomerization catalysts comprise molecular sieves such as EU-2, ZSM-48, beta zeolite and combined beta zeolite and zeolite Y.

Isomerization involves directing the intermediate hydrodeoxygenated feedstock to contact a material catalytically active in isomerization. The conditions are typically a temperature in the interval 250-350° C., a pressure in the interval 30-150 Bar, and a liquid hourly space velocity (LHSV) in the interval 0.5-8. Isomerization is substantially thermally neutral and consumes only hydrogen in hydrocracking side reactions so only a moderate amount of hydrogen is added in the isomerization section. When the active metal on the material catalytically active in isomerization is a noble metal, the hydrodeoxygenated feedstock is typically purified by gas/liquid separation to reduce the content of potential catalyst poisons to low levels such as levels of sulfur, nitrogen and carbon oxides to below 1-10 $ppm_{molar}$. When the active metal is a base metal the gas phase of the intermediate hydrodeoxygenated feedstock preferably contains at least 50 $ppm_v$ sulfur.

For the hydrodeoxygenated intermediate product stream to be used as a kerosene fraction, the boiling point range must be adjusted. The boiling point is adjusted by hydrocracking of long paraffins to shorter paraffins, by directing the hydrodeoxygenated intermediate product to contact a material catalytically active in hydrocracking.

The material catalytically active in hydrocracking is of a nature similar to that of the material catalytically active in isomerization, and it typically comprises an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU, but amorphous acidic oxides such as silica-alumina may also be used) and a refractory support (such as alumina, silica or titania, or combinations thereof). The difference to a material catalytically active in isomerization is typically the nature of the acidic support, which may be of a different structure (even amorphous silica-alumina) or have a different acidity e.g. due to silica:alumina ratio. The catalytically active material may comprise further components, such as boron or phosphorous. Preferred hydrocracking catalysts comprise molecular sieves such as ZSM-5, zeolite Y or beta zeolite.

Hydrocracking involves directing the hydrocarbons to contact a material catalytically active in hydrocracking. The conditions are typically a temperature in the interval 250-

400° C., a pressure in the interval 30-150 Bar, and a liquid hourly space velocity (LHSV) in the interval 0.5-4. As hydrocracking is exothermal, the process may involve intermediate cooling e.g. by quenching with cold hydrogen, feed or product. When the active metal on the material catalytically active in isomerization is a noble metal, the hydrodeoxygenated feedstock is typically purified by gas/liquid separation to reduce the content of potential catalyst poisons to low levels such as levels of sulfur, nitrogen and carbon oxides to below 1-10 $ppm_{molar}$. When the active metal is a base metal the gas phase of the hydrocarbons preferably contains at least 50 $ppm_v$ sulfur.

Hydrodeoxygenation of unsaturated fatty acids and hydrocracking may also produce aromatics as a side reaction, especially if the temperature and/or the conversion is high. Therefore, a low conversion during hydrocracking has typically been desired, hindering full conversion to a kerosene fraction. One consideration in increasing conversion has been to recycle hydrocracked intermediate product for additional contact with the material catalytically active in hydrocracking, but even this may produce an extensive amount of aromatics.

Therefore, it may be further necessary to direct the hydrocracked intermediate product to contact a material catalytically active in hydrodearomatization, which is surprising, as the renewable feedstocks contain no or little aromatics.

In some instances hydrodearomatization may be satisfactorily carried out in the presence of the material catalytically active in hydroisomerization, but it may also be necessary to have a separate reactor or reactor bed with material catalytically active in hydrodearomatization.

The material catalytically active in hydrodearomatization typically comprises an active metal (typically elemental noble metals such as platinum and/or palladium but possibly also sulfided base metals such as nickel, cobalt, tungsten and/or molybdenum) and a refractory support (such as amorphous silica-alumina, alumina, silica or titania, or combinations thereof). Hydrodearomatization is equilibrium controlled, with high temperatures favoring aromatics, noble metals are preferred as the active metal, since they are active at lower temperatures, compared to base metals.

Hydrodearomatization involves directing an intermediate product to contact a material catalytically active in hydrodearomatization. As the equilibrium between aromatics and saturation molecules shifts towards aromatics at elevated temperatures, it is preferred that the temperature is moderate. The conditions are typically a temperature in the interval 200-350° C., a pressure in the interval 30-150 Bar, and a liquid hourly space velocity (LHSV) in the interval 0.5-8. As the preferred active metal on the material catalytically active in hydrodearomatization is a noble metal, the hydrocracked intermediate product is typically purified by gas/liquid separation to reduce the content of sulfur to below 1-10 ppm.

This necessity to combine 3 or 4 catalytically active materials for conversion of renewable feedstocks into jet fuel naturally complicates the process layout, and the sequence of the materials must be considered carefully. In addition, recycle may be used for three different purposes; gas recycle for efficient use of hydrogen, liquid recycle around the material catalytically active in hydrocracking to maximize the yield of the kerosene fraction and liquid recycle around the material catalytically active in hydrodeoxygenation to limit the temperature increase due to exothermal hydrodeoxygenation reactions.

According to the present disclosure the boiling point of the product is adjusted by hydrocracking in a so-called reverse staging layout. Here the feedstock is combined with a hydrocracked hydrocarbon and directed to the hydrodeoxygenation reactor. The hydrodeoxygenated product stream is split according to boiling point, and at least an amount of the product boiling above the jet range is recycled to a hydrocracking reactor upstream the hydrodeoxygenation reactor. The recycle ratio may be maximized to ensure full conversion to product boiling in the jet range, or a lower recycle ration may be chosen, while purging an amount of product boiling above the jet range, e.g. for use as diesel.

The hydrodearomatization will typically require sweet conditions, as the catalyst typically comprises a noble metal, which operates at lower temperatures, thus employing the fact that the equilibrium of the hydrodearomatization reaction is shifted away from aromatics at low temperatures. Therefore, a separation of gases may be carried out prior to hydrodearomatization, and optionally also a separation of intermediate hydrocracked product according to boiling point, such that only intermediate hydrocracked product boiling in the kerosene range contacts the material catalytically active in hydrodearomatization. Isomerization may be carried out either in connection with hydrocracking or in connection with hydrodearomatization. In both cases the material catalytically active in isomerization may be positioned either upstream or downstream the material catalytically active in hydrocracking or hydrodearomatization respectively.

Operating the material catalytically active in hydrocracking with recycle allows full conversion at moderate temperatures, thus maintaining a high yield of kerosene and minimized over-cracking to naphtha and lighter. The use of an isomerization catalyst to improve freezing point of the jet fuel, allows increasing the distillation endpoint of the jet fuel while still meeting freezing point requirement. Finally, since the second stage will saturate aromatics, it is not required for the first stage to meet any aromatics requirements, which allows the first stage to treat heavier and/or more aromatic, naphthenic or unsaturated feedstocks as well as feedstocks such as used cooking oil, pyrolysis products or tall oil pitch, which are known to produce aromatics in small amounts in typical hydroprocessing conditions, since these aromatics will be saturated in the second stage.

One embodiment according to the present disclosure corresponds to a process in which a stream comprising oxygenates and hydrocracked recycled hydrocarbons, and also comprising an amount of sulfur is directed to a hydrodeoxygenation reactor containing a catalytically active material comprising one or more base metals and a refractory support, with low acidity. Such a material is active in hydrodeoxygenation and other hydrotreatment reactions removing heteroatoms and double bonds. An amount of sulfide must be present in the feed stream to the hydrodeoxygenation reactor, either as part of the hydrocracked recycled hydrocarbons, or as added sulfide to the feed stream to the hydrodeoxygenation reactor. The hydrocracked recycled hydrocarbons contribute as a heat sink, absorbing the released heat of reaction from the hydrodeoxygenation, thus maintaining a moderate temperature in the hydrodeoxygenation reactor. This step provides a stream comprising a high amount of saturated linear alkanes, in combination with an amount of water, hydrogen sulfide and ammonia.

The hydrotreated stream is directed to a fractionator (after appropriate removal of the gas phase in a separator train), and at least a gas fraction, an intermediate fraction and a bottoms fraction of the hydrotreated stream are withdrawn. All streams out of the fractionator have a very low level of water, hydrogen sulfide and ammonia. The bottoms fraction will be too heavy for being used as jet product, and is recycled.

The bottoms fraction of the hydrotreated stream is directed to a hydrocracking reactor containing a catalytically active material comprising either one or more base metals or one or more noble metals and a refractory support with high acidity. Such a material is active in hydrocracking, and this step provides a stream in which higher boiling hydrocarbons are converted to lower boiling hydrocarbons.

For reasons of cost, a base metal material may be preferred, and in this case addition of an amount of sulfur, e.g. as DMDS is required at the inlet of the hydrcracking reactor. It may alternatively be preferred to operate with a more expensive and more selective noble metal material; in this case sulfur addition is not required. The severity of the hydrocracking process will define the boiling point characteristics of the product, and it will typically be operated with full conversion of the fraction boiling above the diesel range. If hydrocracking severity is selected for full conversion of the fraction boiling above the jet range the yield loss to gases and naphtha will typically be higher.

If the material catalytically active in hydrocracking comprises noble metals it is necessary to add sulfide, in the form of hydrogen sulfide or di methyl di sulfide (DMDS) prior to the hydrodeoxygenation reactor.

The intermediate hydrotreated fraction has a boiling range which is suitable for use as jet fuel, but the content of aromatics and the freezing point are not within specification. Therefore, this fraction is directed to an isomerization reactor containing a material catalytically active in isomerization and a material catalytically active in hydrodearomatization. Both materials are based on a noble metal catalyst, such as platinum, palladium or a combination, in combination with an acidic support. For isomerization the acidic support is preferably shape selective, e.g. a zeolite, to provide a selective isomerization, rearranging linear alkanes to branched alkanes, with minimal production of lighter hydrocarbons. For hydrodearomatization, an acidic support also contribute to the reaction, and in addition as the activity of noble metals is higher than that of base metals, the reaction will take place at lower temperatures.

As the equilibrium between aromatic and non-aromatic compounds is shifted away from aromatics at low temperatures, noble metals provide the benefit that the lower temperature matches the equilibrium. Hydrodearomatization may even take place on the material catalytically active in isomerization, which often will have some hydrodearomatization activity. An amount of hydrocracking may occur in the isomerization reactor, and therefore it may be preferred that the hydrocracked stream is slightly heavier than jet specifications.

The layout therefore provides a full conversion of feedstock to jet range or lighter product, as all heavy product is recycled and hydrocracked. The jet range yield is higher than a layout where all hydrocarbons are hydrocracked, since the jet range fraction of the hydrodeoxygenated stream is not recycled to the hydrocracker, but only the bottom fraction from the fractionator.

Furthermore the adjustment of freezing point is made selectively by isomerization on a noble metal catalyst, independently of hydrocracking conditions, and finally hydrodearomatization may be efficiently carried out at moderate temperatures in the same reactor and possibly even the same catalytically active material as isomerization.

Should it be desired to produce diesel and not jet fuel, hydrocracking is not desired. In this case, it may be preferred to either by-pass the hydrocracking reactor or alternatively cool the product prior to this reactor, such that it is inactive. The process plant may be configured for allowing such a configuration with short notice, e.g. by setting up appropriate equipment and control in the control room.

DETAILED DESCRIPTION

Figure 1:
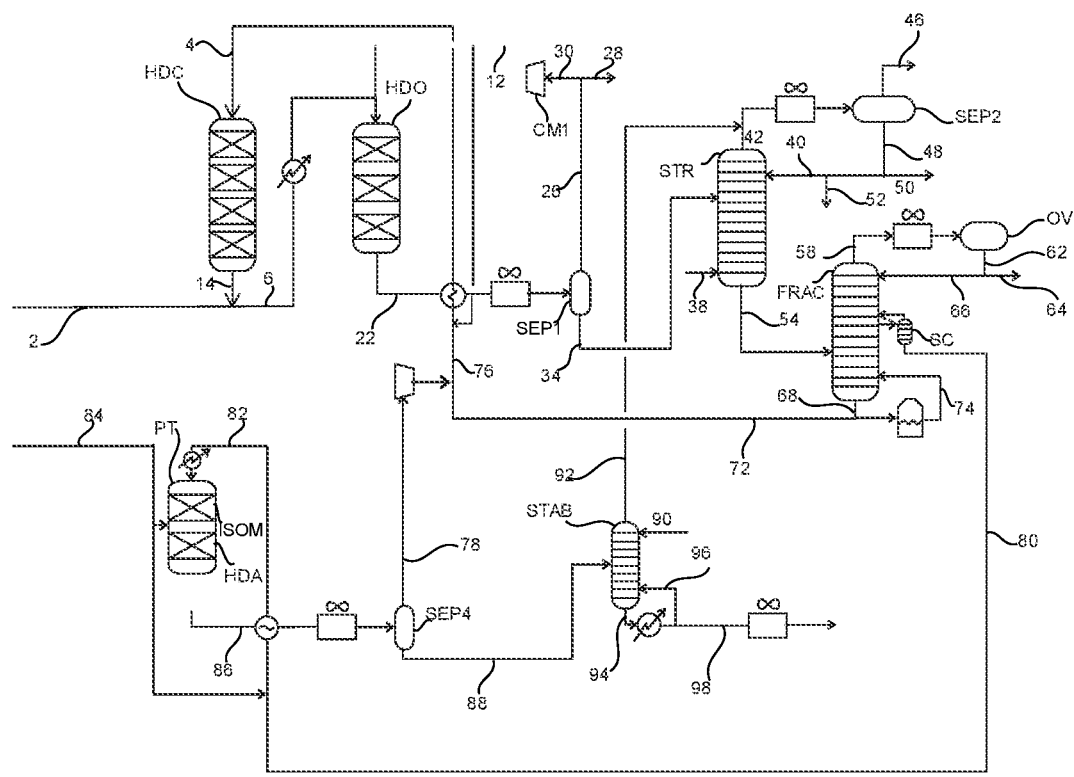
FIG. 1 shows a process according to the present disclosure.

FIG. 1 shows a process layout for production of a hydrocarbon suitable for use as jet fuel (98) from a renewable feedstock (2), wherein the renewable feedstock (2) is combined with a hydrocracked intermediate product (14) and directed as a hydrodeoxygenation feed stream (6) together with an amount of a hydrogen rich stream (12) to a hydrodeoxygenation section (HDO) where it contacts a material catalytically active in hydrodeoxygenation under hydrodeoxygenation conditions. This provides a hydrodeoxygenated intermediate product (22). The hydrodeoxygenated intermediate product (22) is directed to a gas/liquid separator (SEP1) where it is separated into a gaseous fraction (26) and a liquid hydrocracked intermediate product (34). The gaseous fraction (26) is split in an optional purge (28) and a recycle gas (30) which is pressurized in a compressor (CM1) and directed as hydrogen supply (12) to the hydrodeoxygenation section (HDO) and a hydrocracking section (HDC). The liquid hydrocracked intermediate product (34) is directed to a stripper (STR), which also receives a stripping medium (38) and optionally a stripper overhead recycle (40). From the stripper a gaseous stripper product (42) is directed to a gas/liquid separator (SEP2), from which an vapor phase product (46) and a light naphtha fraction (48) are withdrawn. An amount of the light naphtha is withdrawn as product (50), an amount (52) may optionally be directed as feed (90) to a kerosene stabilizer (STAB) and an amount is directed as overhead recycle (40) to the stripper (STR). The liquid stripper product (54) is directed to fractionator (FRAC), from which a light overhead stream (58) is directed to an overhead vessel (OV), from which a heavy naphtha (62) is withdrawn. An amount of heavy naphtha (64) is withdrawn as product and a further amount (66) is directed as fractionator recycle (66). A high boiling product fraction (68) is split in to a recycle stream (72) and a reboiled stream (74). The recycle stream (72) is combined with a gaseous fraction (78) and directed as a hydrocracker feed stream (4) to a hydrocracking section (HDC) operating under hydrocracking conditions. From a side column (SC) a hydrodeoxygenated intermediate jet product (80) is withdrawn and combined with a of hydrogen rich stream (84) and directed as feed (82) to a post treat section (PT), where it contacts a material catalytically active in isomerization (ISOM) under isomerization conditions and a material catalytically active in hydrodearomatization (HDA) under hydrodearomatization conditions, optionally receiving further hydrogen, providing a treated product (86), which is directed to a product gas/liquid separator (SEP4) from which a second gaseous fraction (78) is withdrawn and combined with the recycle stream (72) and provided as make-up hydrogen in a feedstream to a hydrocracking section (HDC). An intermediate jet product (88) is withdrawn from the product gas/liquid separator (SEP4), and directed to a further means of separation (STAB), such as a kerosene stabilizer, from which a liquid product (94) is withdrawn and split in a hydrocarbon fraction suitable for use as jet fuel (98) and a reboiler liquid (96). The gaseous overhead from the kerosene stabilizer (92) is combined with the gaseous stripper product (42) and directed to a gas/liquid separator (SEP2).

In a further embodiment (not shown) the second gaseous fraction (78) is not directed as make-up gas for the hydrodeoxygenation section, but instead directed to the posttreatment section (PT), requiring an additional compressor, but also resulting in added simplicity. In this case make-up hydrogen is then added separately to the hydrodeoxygenation section.

In a further embodiment the gaseous overhead from the kerosene stabilizer (92) may be handled in a separate overhead circuit with the benefit of simplicity and independence, but at the cost of extra equipment items for cooling, separation and reflux pumps.

In a further embodiment the separator, fractionation and light ends recovery sections can be configured in multiple ways as it is known to the skilled person. If light materials like LPG or propane are valuable, the recovery of these can be improved by using a sponge oil absorption system e.g. using the heavy naphtha from the fractionator overhead as lean oil and returning the rich oil to the stripper.

Figure 2:
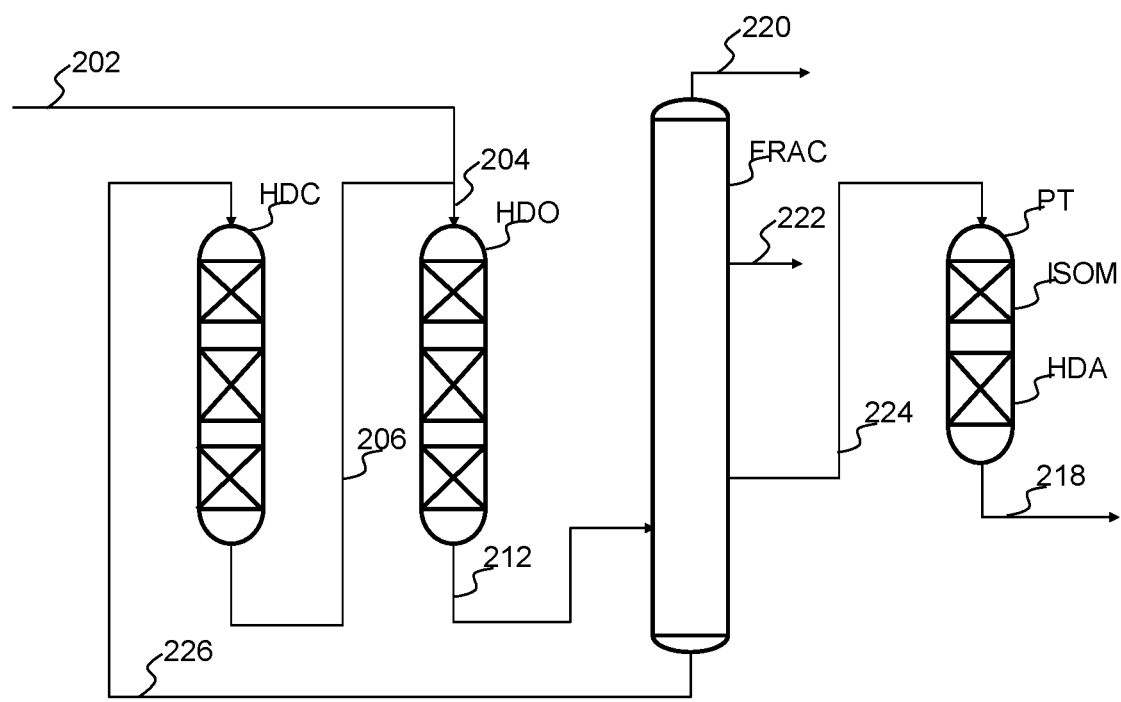
FIG. 2 shows a simplified illustration of a process according to the present disclosure.

FIG. 2 is a simplified figure showing a layout similar to that of FIG. 1, omitting supply of gaseous streams and details of separation for simplicity. A renewable feedstock (202) is combined with a hydrocracked intermediate product (206) and directed as a hydrodeoxygenation feed stream (204) together with an amount of a hydrogen rich stream (not shown) to a hydrodeoxygenation section (HDO) where it contacts a material catalytically active in hydrodeoxygenation under hydrodeoxygenation conditions. This provides a hydrodeoxygenated intermediate product (212). The hydrodeoxygenated intermediate product (212) is directed to a fractionation section (FRAC) shown for simplicity as a single unit, separating the hydrodeoxygenated intermediate product in a light overhead stream (220), a naphtha stream (222), a hydrodeoxygenated intermediate jet product (224) and a high boiling product fraction (226). The high boiling product fraction (226) is directed as a recycle stream to a hydrocracking section (HDC) operating under hydrocracking conditions, providing a hydrocracked intermediate product (206), which, as mentioned, is combined with the renewable feedstock (202). The hydrodeoxygenated intermediate jet product (224) is directed as feed to a post treat section (PT), where it contacts a material catalytically active in isomerization (ISOM) and a material catalytically active in hydrodearomatization (HDA) under hydrodearomatization conditions, providing a treated jet fuel product (218).

Figure 3:
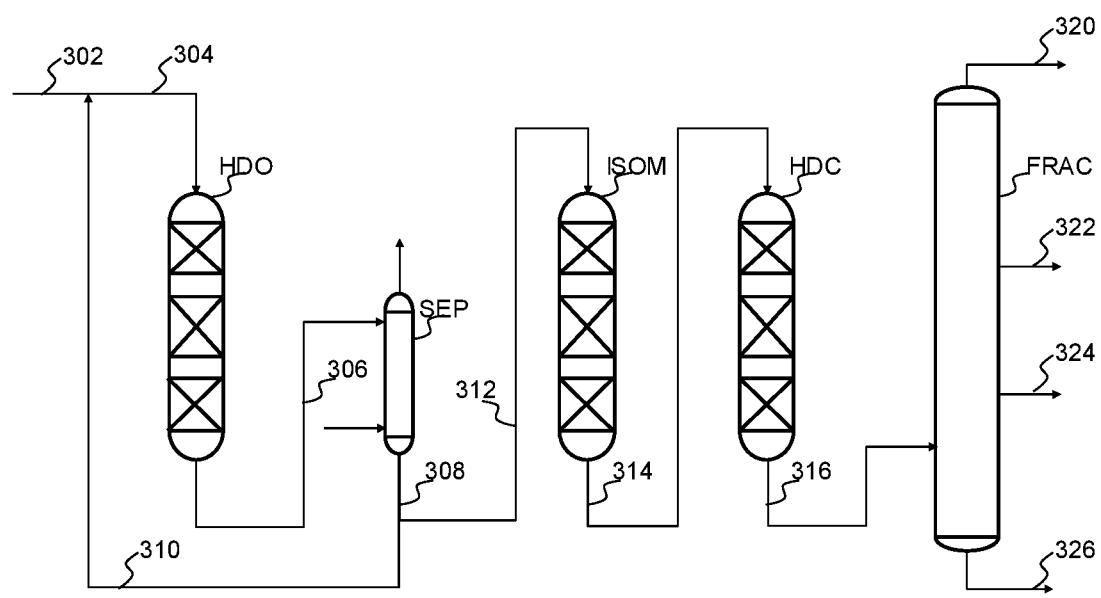
FIG. 3 shows a simplified illustration of a process according to the prior art.

FIG. 3 shows an example of the prior art, in a level of detail similar to FIG. 2, omitting supply of gaseous streams and details of separation for simplicity. A renewable feedstock (302) is combined with a recycle diluent stream (310) and directed as a hydrodeoxygenation feed stream (304) together with an amount of a hydrogen rich stream (not shown) to a hydrodeoxygenation section (HDO) where it contacts a material catalytically active in hydrodeoxygenation under hydrodeoxygenation conditions. This provides a hydrodeoxygenated intermediate product (306), from which gases are separated e.g. in a stripper (SEP), providing a sweet hydrogenated intermediate product (308), which is split into said recycle diluent stream (310) and an isomerization feed (312) which is directed to a hydroisomerization section (ISOM) where it contacts a material catalytically active in isomerization under isomerization conditions, providing a dewaxed intermediate product (314). The dewaxed intermediate product (314) is directed to a hydrocracking section (HDC) where it contacts a material catalytically active in hydrocracking under hydrocracking conditions, providing a hydrocracked product (316). The hydrocracked product (316) is directed to a fractionation section (FRAC) shown for simplicity as a single unit, separating the hydrocracked product in a light overhead stream (320), a naphtha stream (322), a jet product (324) and a bottom diesel fraction (326).

EXAMPLES

The performance of the process layouts shown in FIGS. 2 and 3 have been compared, based on two similar feedstocks, and process conditions optimized for maximum jet yield.

Table 1 shows the characteristics of a renewable feedstock which is a mixture of 50% used cooking oil and 50% animal fat. The feedstock comprises 6% aromatics and 80% boils above 500° C.; mainly due to the presence of high boiling triglycerides.

Feedstock A was treated in a process in accordance with FIGS. 2 and 3, and the results of this treatment is shown in Table 2.

In the hydrotreatment a significant conversion of boiling point is seen due to triglycerides being converted to alkanes. In addition, an amount of conversion is observed in the hydrocracking reactor and the isomerization reactor. The true conversion per pass is however quite low, since the amount of recycle is high.

The results of both examples show a production of a jet fuel with excellent properties, a low freezing point (−40° C.) and a low aromatics content (<0.5 wt %). The example according to the present disclosure (FIG. 2) has a jet yield of 67 wt/wt %, whereas the Example according to the prior art (FIG. 3) has a jet yield of 58 wt/wt %, whereas 11 wt/wt % diesel is produced. In addition, naphtha is produced in both scenarios. In a process designed for production of jet, the yield difference of 9% is of course valuable.

The configuration of FIG. 2, where the product of hydrodeoxygenation is split in a light and a heavy fraction and the heavy fraction is recycled to a hydrocracking reactor upstream the hydrodeoxygenation, results in a full conversion of heavy feedstock to jet product, while avoiding directing light hydrocarbons to the hydrocracking section, and thus a higher yield of jet product compared to the configuration of FIG. 3.

TABLE 1

| SG | 0.9209 |
|---|---|
| Aromatics in feed, wt/wt % | 6 |
| distillation: | |
| SimDist, wt/wt % | |
| IBP | 340 |
| 5% | 365 |
| 10% | 398 |
| 20% | 533 |
| 30% | 582 |
| 40% | 597 |
| 50% | 601 |
| 60% | 602 |
| 70% | 608 |
| 80% | 610 |

TABLE 1-continued

| | |
|---|---|
| 90% | 611 |
| 95% | 612 |
| FBP | 695 |

TABLE 2

| Example | FIG. 2 | FIG. 3 |
|---|---|---|
| P | 70barg | 70 barg |
| T(HDO) | 320 | 320° C. |
| T(HDC) | 350 | 310 |
| T(DWX) | 330 | 320 |
| LHSV (DWX) | 2 | 2 |
| LHSV HDC | 1 | 1 |
| Freezing pt Jet | −40° C. | −40° C. |
| Aromatics content in jet boiling range | <0.5 wt/wt % | <0.5 wt/wt % |
| Naphtha boiling range yield (bp.30-110° C.), wt/wt % | 12 | 11 |
| Jet boiling range yield (bp.110-310° C.), wt/wt % | 67 | 61 |
| Heavier than jet yield (bp.310-370° C.), wt/wt % | — | 8 |

The invention claimed is:

1. A process for production of a hydrocarbon fraction suitable for use as jet fuel from an oxygenate feedstock, comprising the steps of:
   a. feeding the oxygenate feedstock to the process,
   b. combining all of the fed feedstock with a hydrocracked intermediate product to form a combined feedstock, directing the combined feedstock to contact a material catalytically active in hydrodeoxygenation (HDO) under hydrodeoxygenation conditions to provide a hydrodeoxygenated intermediate product,
   c. defining a fractionation boiling point, fractionating said hydrodeoxygenated intermediate product in at least two hydrocarbon liquid fractions, including a first fraction of which at least 90% boils below said defined boiling point and a second fraction of which at least 90% boils above said defined fractionation boiling point,
   d. directing at least an amount of said second fraction to contact a material catalytically active in hydrocracking (HDC) under hydrocracking conditions to provide the hydrocracked intermediate product, wherein an entirety of the hydrocracked intermediate product is combined with the oxygenate feedstock of step (a),
   wherein the process excludes the first fraction of step (c) and the oxygenate feedstock of step (a) from being directed to contact any material catalytically active in hydrocracking (HDC) under hydrocracking conditions to provide the hydrocracked intermediate product.

2. The process according to claim 1 wherein step (b) comprises separating hydrodeoxygenated intermediate product according to boiling point, to provide a hydrocracked intermediate jet product having T10 above 205° C. and final boiling point below 310° C. according to ASTM D86.

3. The process according to claim 1, wherein the total volume of hydrogen sulfide relative to the volume of molecular hydrogen in the gas phase of the total stream directed to contact the material catalytically active in hydrodeoxygenation is at least 50 ppm$_v$, optionally originating from an added stream comprising one or more sulfur compounds.

4. The process according to claim 1, wherein said oxygenate feedstock comprises at least 50% wt triglycerides or fatty acids.

5. The process according to claim 1, wherein hydrodeoxygenation conditions involve a temperature in the interval 250-400° C., a pressure in the interval 30-150 Bar, and a liquid hourly space velocity (LHSV) in the interval 0.1-2 and wherein the material catalytically active in hydrodeoxygenation comprises molybdenum or optionally tungsten, optionally in combination with nickel and/or cobalt, supported on a carrier comprising one or more refractory oxides.

6. The process according to claim 1, wherein hydrocracking conditions involve a temperature in the interval 250-400° C., a pressure in the interval 30-150 Bar, and a liquid hourly space velocity (LHSV) in the interval 0.5-4, optionally together with intermediate cooling by quenching with cold hydrogen, feed or product and wherein the material catalytically active in hydrocracking comprises (a) one or more active metals taken from the group platinum, palladium, nickel, cobalt, tungsten and molybdenum, (b) an acidic support taken from the group of a molecular sieve showing high cracking activity, and having a topology of MFI, BEA and FAU and amorphous acidic oxides and (c) a refractory support.

7. The process according to claim 1, wherein the process conditions are selected such that the conversion, defined as the difference in the amount of material boiling above 310° C. in said hydrocracked intermediate product and the amount of material boiling above 310° C. in said second fraction, relative to the amount of material boiling above 310° C. in said second fraction, is above 20%.

8. The process according to claim 1, wherein at least an amount of said first fraction is directed to contact a material catalytically active in hydrodearomatization (HDA) under hydrodearomatization conditions to provide a hydrodearomatized product comprising less than 1 wt/wt %, calculated by total mass of aromatic molecules relative to all hydrocarbons in the stream.

9. The process according to claim 8, wherein hydrodearomatization conditions involve a temperature in the interval 200-350° C., a pressure in the interval 20-100 Bar, and a liquid hourly space velocity (LHSV) in the interval 0.5-8 and wherein said material catalytically active in hydrodearomatization comprises an active metal taken from the group comprising platinum, palladium, nickel, cobalt, tungsten and molybdenum, and a refractory support.

10. The process according to claim 8 wherein a hydrogen rich stream comprising at least 90 vol/vol % hydrogen is directed to contact the material catalytically active in hydrodearomatization (HDA).

11. The process according to claim 1, wherein at least an amount of said first fraction is directed to contact a material catalytically active in isomerization (ISOM) under isomerization conditions.

12. The process according to claim 11, wherein isomerization conditions involves a temperature in the interval 250-350° C., a pressure in the interval 20-100 Bar, and a liquid hourly space velocity (LHSV) in the interval 0.5-8 and wherein the material catalytically active in isomerization comprises an active metal taken from the group comprising platinum, palladium, nickel, cobalt, tungsten and molybdenum, an acidic support, and an amorphous refractory support comprising one or more oxides taken from the group comprising alumina, silica and titania.

13. The process according to claim 8, wherein the hydrodearomatized product is directed to a gas/liquid separator (SEP4) to provide a second stage gaseous fraction and a treated intermediate jet product which is directed to a further means of separation (STAB), to provide said hydrocarbon fraction suitable for use as a jet fuel and a treated product off gas.

14. The process according to claim 8, wherein at least an amount of said hydrodearomatized product is directed to contact a material catalytically active in isomerization (ISOM) under isomerization conditions.

15. The process according to claim 14, wherein isomerization conditions involves a temperature in the interval 250-350° C., a pressure in the interval 20-100 Bar, and a liquid hourly space velocity (LHSV) in the interval 0.5-8 and wherein the material catalytically active in isomerization comprises an active metal taken from the group comprising platinum, palladium, nickel, cobalt, tungsten and molybdenum, an acidic support, and an amorphous refractory support comprising one or more oxides taken from the group comprising alumina, silica and titania.

* * * * *